United States Patent [19]

Ostertag et al.

[11] Patent Number: 4,629,513
[45] Date of Patent: Dec. 16, 1986

[54] PREPARATION OF TRANSPARENT GOLDEN YELLOW, THERMALLY STABLE TWO-PHASE PIGMENTS OF THE GENERAL FORMULA XZNO.ZNFE$_2$O$_4$

[75] Inventors: Werner Ostertag, Gruenstadt; Roland Bauer, Bensberg-Refrath; Gustav Bock, Neustadt, all of Fed. Rep. of Germany

[73] Assignee: BASF Aktiengesellschaft, Fed. Rep. of Germany

[21] Appl. No.: 716,701

[22] Filed: Mar. 27, 1985

[30] Foreign Application Priority Data

Mar. 27, 1984 [DE] Fed. Rep. of Germany ....... 3411215

[51] Int. Cl.$^4$ .............................................. C04B 14/00
[52] U.S. Cl. .................................... 106/292; 106/304; 106/309
[58] Field of Search ........................ 106/292, 304, 309

[56] References Cited

U.S. PATENT DOCUMENTS

| | | | |
|---|---|---|---|
| 3,918,985 | 11/1975 | Ebenhoech et al. | 106/304 |
| 4,292,294 | 9/1981 | Patil et al. | 106/304 |
| 4,374,677 | 2/1983 | Senda et al. | 106/304 |
| 4,376,656 | 3/1983 | Senda et al. | 106/304 |

FOREIGN PATENT DOCUMENTS 0074442 3/1983 European Pat. Off. .

*Primary Examiner*—Paul Lieberman
*Assistant Examiner*—Willie J. Thompson
*Attorney, Agent, or Firm*—Keil & Weinkauf

[57] ABSTRACT

Transparent, golden yellow, thermally stable two-phase pigments of the general formula xZnO.ZnFe$_2$O$_4$, where x is from 0.5 to 1.5, are prepared by a method in which the pH of an aqueous phase which contains transparent iron oxide yellow in suspension and zinc ions in solution is brought to 7–10, and the product is treated at above 200° C. before or after being isolated from the aqueous phase.

3 Claims, No Drawings

PREPARATION OF TRANSPARENT GOLDEN YELLOW, THERMALLY STABLE TWO-PHASE PIGMENTS OF THE GENERAL FORMULA XZNO.ZNFE2O4

In inorganic pigment chemistry, yellowish brown high-hiding zinc iron oxide pigments have long been known and are valued because of their thermal stability. They are used for surface coatings, in finishes, for coloring plastics and also in the ceramic sector for coloring glazes. The zinc iron oxide pigments consist predominantly of zinc iron spinel. For tinctorial reasons, however, a further phase consisting of pure ZnO is always added to the zinc iron spinel to reinforce the yellowish hue of the pigment. Such two-phase pigments, whose composition substantially corresponds to the formula $ZnO.ZnFe_2O_4$, have been available commercially for a number of years.

The pigments are prepared by heating thoroughly mixed, finely milled zinc oxide (ZnO) and iron oxide ($Fe_2O_3$) or iron yellow (FeOOH) at from 800° to 1200° C. (cf. Pigment Handbook, 1973, page 348). The heated products which have completely reacted are then milled, wet milling generally being preferred to dry milling, owing to the hardness of the pigment particles.

Transparent $ZnO.ZnFe_2O_4$ pigments, i.e. pigments which differ from the high-hiding pigments described above in that they have an extremely small particle size so that, when they are dispersed in finishes, plastics or glasses, they scarcely produce any scattering, have not been disclosed to date. Transparent yellow pigments from the $ZnO.ZnFe_2O_4$ system are of interest if only because the only commercial inorganic yellow pigments which are transparent, i.e. the transparent iron oxide yellow pigments (FeOOH), are thermally stable only up to 160° C., which makes them unsuitable for many applications, for example for coloring plastics.

European patent application No. 74,442 describes acicular spinels which have a particle length of from 0.01 to 0.13 μm and are of the general formula $XFe_2O_4$, where X is Mg, Zn or Sn or a mixture of these. These pigments, which are also thermally stable, are prepared by a method in which an alkali is added to an aqueous solution which contains both iron salts and salts of the other metals stated, and the precipitate is then converted to the abovementioned spinel by oxidation of the iron. However, this procedure only gives a single-phase spinel of the $XFe_2O_4$ type, and not the $ZnO.ZnFe_2O_4$ system, which is of greater interest from a tinctorial point of view. Moreover, the preparation process for $XFe_2O_4$ precipitation products is very difficult to monitor.

It is an object of the present invention to provide a process for the preparation of the transparent two-phase pigments of the formula $xznO.ZnFe_2O_4$, where x is from 0.5 to 1.5, these pigments being of interest from a tinctorial point of view.

We have found that this object is achieved if the pH of an aqueous phase which contains transparent iron oxide yellow in suspension and zinc ions in solution is brought to 7-10, and the product is treated at above 200° C., before or after being isolated from the aqueous phase.

In the novel preparation of the transparent pigments, the starting material used is transparent iron oxide yellow (FeOOH), which is prepared in a conventional manner with a particle size of 0.1 μm or less. To do this, for example, an alkali is added to an aqueous iron sulfate solution at below 40° C., and the resulting precipitate of $Fe(OH)_2$ is oxidized to FeOOH by passing air through the mixture. The preparation of transparent iron oxide yellow is described in, for example, U.S. Pat. No. 2,558,304.

This transparent iron oxide yellow is advantageously further processed in the suspended form in which it is obtained, further processing being carried out according to the invention to give the transparent pigments of the formula $xznO.ZnFe_2O_4$. For this purpose, an aqueous solution of a zinc salt, in particular zinc sulfate, is introduced into the suspension, the amount used corresponding to the desired composition of the pigment. If the reaction solution is acidic, the pH is brought to 7-10 by adding an alkaline solution, for example an alkali metal carbonate or hydroxide; if, on the other hand, it is strongly alkaline, the stated pH is established by adding an acid, e.g. sulfuric acid. In this way, zinc hydroxide is precipitated.

The product is then treated at above 200° C. This treatment can be carried out in two ways:

1. The product is separated off from the aqueous phase, washed, dried and then heated at from 400° to 700° C. In order to avoid particle growth during the heating procedure, the latter advantageously should not exceed 70 minutes. The product from the heating procedure is then milled for a short time, as is usual in pigment preparation for breaking up primary particles produced by agglomeration.

2. In a second version, the reaction suspension is subjected directly to a hydrothermal treatment at from 200° to 360° C., preferably from 250° to 360° C., advantageously for from 10 to 70 minutes. When the pressure has been let down, the solid is filtered off, washed and dried, and agglomerates are broken up by dry milling for a short time.

The pigments are obtained in a very uniform state and have a mean particle size of 0.05 μm. They have a golden yellow hue and possess good transparency in surface coatings and when used to color plastics. Moreover, their essential advantage is that they are stable up to about 350° C., and their hue and transparency do not alter. The pigments exhibit a regular morphology, and X-ray investigations show that they are well crystallized two-phase pigments, a ZnO phase being present in addition to a spinel phase.

An advantage is that the pigments need not correspond strictly to the formula $ZnO.ZnFe_2O_4$, but the ZnO content can vary by ±0.5 mole without the quality of the pigments changing significantly; this is advantageous with regard to production.

EXAMPLE 1

2 liters of an iron(II) sulfate solution having a concentration of 58 g of $FeSO_4.7H_2O$ per liter of $H_2O$ is initially taken in a 5 liter vessel. The pH of the solution is brought to 2 with dilute $H_2SO_4$, after which 86% of the iron in solution is precipitated with a 10% strength by weight $Na_2CO_3$ solution at from 12° to 14° C. in the course of 10 minutes, while stirring. Air is then passed through the suspension, the total amount of iron(II) being oxidized to iron(III) in the course of 3 hours, this being easily detectable from the yellow coloration of the suspension.

120 g of $ZnSO_4.7H_2O$ dissolved in 480 ml of $H_2O$ are then added. 15% strength by weight sodium carbonate solution is then added to the suspension until the pH reaches 8, after which the suspension is filtered, and the solid product is washed sulfate-free and dried. The resulting powder is calcined for 50 minutes at 600° C. in a furnace, cooled and then dry milled for 10 minutes.

The golden yellow, transparent pigment has a mean particle size of 0.05 μm, as can be determined from electron micrographs.

EXAMPLE 2

7 m$^3$ of an aqueous iron(III) sulfate solution containing 58 g of FeSO$_4$.7H$_2$O per liter of H$_2$O are initially taken in a 10 m$^3$ vat and brought to pH 2.2 with dilute sulfuric acid.

A 15% strength by weight aqueous sodium carbonate solution is then metered in at 12° C. until the iron from 52 g/l of FeSO$_4$ is obtained as iron hydroxide. Thereafter, oxidation with atmospheric oxygen is carried out for 4 hours, iron(II) being oxidized to iron(III), which is detectable from the yellow coloration.

The amount of zinc required for the preparation of ZnO.ZnFe$_2$O$_4$, in the form of a 15% strength by weight aqueous zinc sulfate solution (based on ZnSO$_4$.7H$_2$O), is then introduced, after which 15% strength by weight Na$_2$CO$_3$ solution is added at 70° C. until the pH reaches 8.

The precipitation product is then filtered off, washed, dried, and calcined at 605 ±20° C., after which it is wet milled in a ball mill (1 m diameter, 20 rpm) with steatite balls (15 mm diameter) for 10 hours, and then washed and dried. After being dried, the product is dry-milled for a short time.

The golden yellow, transparent pigment has a mean particle size of 0.05 μm. It gives the following analysis:

|  |  |
|---|---|
| Fe$_2$O$_3$ | 48.64% by weight |
| ZnO | 49.92% by weight |
| MgO | 0.09% by weight |
| CaO | 0.37% by weight |
| SiO$_2$ | 0.2% by weight |
| Al$_2$O$_3$ | 0.1% by weight |
| Total | 99.32% by weight |

The contents of MgO, CaO, SiO$_2$ and Al$_2$O$_3$ in the pigment are attributable to the hardness of the water.

EXAMPLE 3

7.7 g of the transparent iron oxide yellow prepared as described in Example 1, together with 140 g of the solution in which it is obtained, and 17.9 g of zinc sulfate (ZnSO$_4$.7H$_2$O) are introduced into a stirred autoclave, and stirring is continued until all the ZnSO$_4$.7H$_2$O has dissolved. 10 g of 25% strength by weight sodium hydroxide solution are then added to the stirred mixture (pH=8). The suspension is heated to 330° C. in an autoclave, while stirring (400 rpm), and is kept at this temperature for 15 minutes. Thereafter, it is cooled and filtered, and the product is washed and dried.

EXAMPLE 4

A 15% strength by weight zinc sulfate solution (based on ZnSO4.7H$_2$O) is introduced into the FeOOH suspension prepared as described in Example 2 in such a manner that the solution contains 1 mole of zinc per mole of iron. This suspension is then brought to pH 7.5 with 10% strength by weight sodium hydroxide solution and is pumped, with the aid of a piston pump and at a rate of 7 liters/hour, into a continuously operated hydrothermal reactor, in which the suspension is heated at 300° C. The residence time of the suspension in the hydrothermal reactor is 20 minutes.

The suspension obtained is filtered, and the solid is washed, dried and milled.

We claim:

1. A process for the preparation of a transparent, golden yellow, thermally stable two-phase pigment of the formula xZnO.ZnFe$_2$O$_4$, where x is from 0.5 to 1.5, which comprises: suspending iron oxide yellow particles in an aqueous solution containing zinc ions; adjusting the pH of the solution to from 7-10 to precipitate zinc hydroxide, and thereafter heating the pigments at a temperature above 200° C. either before or after the pigments are isolated from the aqueous phase.

2. The process of claim 1, wherein the product is isolated from the aqueous phase, washed, dried, and heated at from 400° to 700° C.

3. The process of claim 1, wherein the reaction mixture is subjected to a hydrothermal treatment at from 200° to 360° C., and the solid product is isolated from the aqueous phase, washed and dried.

* * * * *